(12) United States Patent
Kaneko et al.

(10) Patent No.: US 7,187,426 B2
(45) Date of Patent: Mar. 6, 2007

(54) LIQUID CRYSTAL PANEL, LIQUID CRYSTAL DEVICE, AND ELECTRONIC APPARATUS

(75) Inventors: Hideki Kaneko, Shiojiri (JP); Chihiro Tanaka, Matsumoto (JP); Tadashi Tsuyuki, Nagano-ken (JP)

(73) Assignee: Seiko Epson Corporation (JP)

( * ) Notice: Subject to any disclaimer, the term of this patent is extended or adjusted under 35 U.S.C. 154(b) by 252 days.

(21) Appl. No.: 10/215,269

(22) Filed: Aug. 8, 2002

(65) Prior Publication Data

US 2003/0038904 A1 Feb. 27, 2003

(30) Foreign Application Priority Data

Aug. 9, 2001 (JP) ............................. 2001-243027

(51) Int. Cl.
G02F 1/1345 (2006.01)
(52) U.S. Cl. ...................... 349/149; 349/151; 349/152
(58) Field of Classification Search ................ 349/110, 349/111, 42, 153, 149, 151, 152
See application file for complete search history.

(56) References Cited

U.S. PATENT DOCUMENTS

| 5,530,568 | A | * | 6/1996 | Yamamoto et al. | ......... 349/143 |
| 5,872,610 | A | | 2/1999 | Kobayashi | |
| 6,268,895 | B1 | * | 7/2001 | Shimada et al. | ............ 349/110 |
| 6,424,394 | B1 | * | 7/2002 | Morii | ......................... 349/110 |
| 6,654,084 | B1 | | 11/2003 | Marukawa et al. | |
| 6,657,608 | B2 | * | 12/2003 | Maeda | ......................... 345/90 |
| 6,690,434 | B1 | * | 2/2004 | Yamazaki et al. | ............ 349/42 |
| 2001/0022640 | A1 | | 9/2001 | Nakahara | |
| 2002/0018149 | A1 | * | 2/2002 | Kanayama | ...................... 349/1 |

FOREIGN PATENT DOCUMENTS

| CN | 1178916 A | 4/1998 |
| CN | 1301976 A | 7/2001 |
| JP | 05-107550 | 4/1993 |
| JP | 08-334787 | 12/1996 |

(Continued)

OTHER PUBLICATIONS

Communication from Chinese Patent Office re: counterpart application.

(Continued)

Primary Examiner—Michael G. Lee
Assistant Examiner—Daniel A. Hess
(74) Attorney, Agent, or Firm—Harness, Dickey & Pierce, P.L.C.

(57) ABSTRACT

A liquid crystal panel includes a pair of substrates 2a and 2b individually provided with electrodes 14a and 14b, a sealing material 3 with which the substrates 2a and 2b are attached to each other, a first terminal installed on one substrate 2a, a second terminal which is installed on the other substrate 2b and which is connected to the electrode 14b on the substrate 2b, a conducting material 21 for connecting the first terminal and the second terminal, a wiring 19b which is installed on the substrate 2a and which is connected to the first terminal, and a light-shielding film 23 installed in at least a part of a region, which corresponds to the wiring 19b, on the other substrate 2b.

20 Claims, 12 Drawing Sheets

| | FOREIGN PATENT DOCUMENTS | |
|---|---|---|
| JP | 09-281476 | 10/1997 |
| JP | 10-062768 | 3/1998 |
| JP | 2001-021902 | 1/2001 |
| JP | 2001-21903 | 1/2001 |
| JP | 2001-083504 | 3/2001 |
| JP | 2001-091941 | 4/2001 |
| JP | 2001-133802 | 5/2001 |

OTHER PUBLICATIONS

Communication from Japanese Patent Office regarding counterpart application.

Communication from Korean Patent Office re: counterpart application.

* cited by examiner

LIQUID CRYSTAL PANEL, LIQUID CRYSTAL DEVICE, AND ELECTRONIC APPARATUS

BACKGROUND OF THE INVENTION

This application claims the benefit of priority to Japanese Patent Application 2001-243027 filed Aug. 9, 2001.

1. Technical Field of the Invention

The present invention relates to a liquid crystal device which displays images, for example, characters, numeric characters, and graphics, by modulating light with a liquid crystal. Furthermore, the present invention relates to electronic apparatus comprising the liquid crystal device.

2. Description of the Related Art

In recent years, liquid crystal devices have been used widely as display portions of various sorts of electronic apparatuses, such as cellular phones, portable data terminals, etc. In these liquid crystal devices, generally, a pair of substrates individually provided with electrodes are attached to each other such that electrode-side surfaces face each other while a constant interval, that is, a so-called cell gap, is kept and, in addition, a liquid crystal is encapsulated in the cell gap.

As this liquid crystal device, a liquid crystal device of an active matrix system, in which a liquid crystal is driven by a switching element, and a liquid crystal device of a simple matrix system, in which a liquid crystal is driven without the use of the switching element, have been known. Examples of liquid crystal devices of active matrix systems include those using three-terminal type active elements, such as a TFT (Thin Film Transistor), etc., and those using two-terminal type active elements, such as a TFD (Thin Film Diode), etc, as the switching elements.

As a conventional liquid crystal device, for example, one having a structure shown in FIG. 10 has been known. This liquid crystal device 51 includes a pair of substrates 53a and 53b attached to each other by a sealing material 52, and as shown in FIG. 11, a liquid crystal is encapsulated in the space formed between these substrates, that is, in a cell gap, and therefore, a liquid crystal layer L is formed. The cell gap is maintained to have a constant dimension by spacers 67 dispersed on the surface of any one of the first substrate 53a and the second substrate 53b.

In FIG. 10, on the surface of the first substrate 53a on the liquid crystal L side, a plurality of linear line wirings 56 are arranged in parallel with each other and, therefore, arranged in the shape of stripes while pixel electrodes 54 are formed on individual line wirings 56 with TFD elements 57 therebetween. Since the line wirings 56 are formed in the shape of stripes, the pixel electrodes 54 are arranged in the shape of a dot matrix. As shown in FIG. 11, an orientation film 58a is formed on the surface of the first substrate 53a, on which the pixel electrodes 54 are formed.

In FIG. 10, in order to clearly show the structures of the pixel electrode 54 and the TFD element 57, those elements are schematically shown to be enlarged, and the interval between those adjacent to each other is schematically shown to be larger than in practice.

The first substrate 53a includes a substrate overhang portion 59a overextending beyond a perimeter of the second substrate 53b, and an IC 61a for driving the liquid crystal is mounted on the surface of the substrate overhang portion 59a by an ACF (Anisotropic Conductive Film) 65. That is, a COG (Chip On Glass) mounting system is performed. Each of the line wirings 56 extends outside the sealing material 52, and the tip thereof is connected to a terminal, that is, a bump (not shown in the drawing), of the IC 61a for driving the liquid crystal.

On the surface of the second substrate 53b on the liquid crystal L side, a plurality of linear electrodes 62 are arranged in parallel with each other and, therefore, arranged in the shape of stripes. These electrodes 62 are formed nearly perpendicularly to the line wirings 56 on the first substrate 53a and, furthermore, are formed with the positional relationship of facing individual pixel electrodes 54.

The second substrate 53b includes a substrate overhang portion 59b extending beyond the perimeter of the first substrate 53a, and an IC 61b for driving the liquid crystal is mounted on the surface of the substrate overhang portion 59b by an ACF 65. That is, mounting a COG (Chip On Glass) mounting system is performed. Each of the electrodes 62 extends outside the sealing material 52, and the tip thereof is connected to a terminal, that is, a bump (not shown in the drawing), of the IC 61b for driving liquid crystal.

As shown in FIG. 11, a transflective film 63 is formed on the surface of the second substrate 53b on the liquid crystal L side, a color filter film 64 is further formed thereon, and an overcoat layer 66 is further formed thereon. The aforementioned electrodes 62 are formed on the overcoat layer 66, and an orientation film 58b is formed on those electrodes 62.

A phase difference plate 68a is installed on the outer surface of the first substrate 53a, and a polarizing plate 69a is further installed thereon. A phase difference plate 68b is installed on the outer surface of the second substrate 53b, and a polarizing plate 69b is further installed thereon. An illumination device 71 which acts as a backlight is installed at the position facing the outer surface of the second substrate 53b on which the polarizing plate 69b is installed.

In FIG. 10, a point at which the pixel electrode 54 and a counter electrode 62 overlap one another constitutes one dot, and one color picture element, for example, one color picture element of R, G, or B, of the color filter film 64 shown in FIG. 11 is installed corresponding to this one dot. Three color dots of R, G, and B constitute one unit and, therefore, one pixel is formed.

In FIG. 10, one of the ICs 61a and 61b for driving the liquid crystal supplies scanning signals to corresponding pixel electrodes 54 or corresponding counter electrodes 62, the other of those ICs 61a and 61b for driving the liquid crystal supplies data signals to corresponding pixel electrodes 54 or corresponding counter electrodes 62 and, thereby, the orientation of the liquid crystal in a plurality of pixels arranged in the shape of a dot matrix is controlled.

In FIG. 11, when the surroundings of the liquid crystal device 51 are bright, external light incident from the first substrate 53a side is reflected at the transflective film 63 and is supplied to the liquid crystal layer L. When the surroundings of the liquid crystal device 51 are dark, the illumination device 71 emits light, and the light passes through the transflective film 63 and is supplied to the liquid crystal layer L. The light thus supplied to the liquid crystal layer L is modulated on a pixel basis by the liquid crystal, the orientation thereof being controlled on a pixel basis. According to this, an image is displayed outside the first substrate 53a.

In FIG. 10, the region partitioned by a plurality of pixel electrodes 54 arranged in the shape of a matrix is a drive region, that is, an effective display region V, and images, such as characters, numeric characters, etc., are formed in this effective display region V. A dummy pixel region W1 is formed outside the effective display region V while succeeding thereto, and a metal film region W2 is further formed outside the dummy pixel region W1 while succeeding thereto.

In the dummy pixel region W1, as a matter of form, a pattern in the same shape as the pixel electrodes 54 is formed. However, the pattern formed here is not a transparent electrode material, such as ITO (Indium Tin Oxide), but the portions corresponding to the electrodes are covered with opaque metal films. According to this, this dummy pixel region W1 is made to be a light-shielding region.

The metal film region W2 is formed from, for example, a metal constituting the TFD element 57, e.g., Ta (tantalum), and is also made to be a light-shielding region. As described above, the light-shielding regions W1 and W2 are formed between the effective display region V and the sealing material 52. These light-shielding regions W1 and W2 increase the contrast of the effective display region V by darkening the surrounding of the effective display region V, that is, by reducing the light transmittance and, therefore, improve display quality.

However, regarding the conventional liquid crystal device 51 shown in FIG. 10, since the substrate overhang portion 59a, on which the IC 61a for driving liquid crystal is mounted, and the substrate overhang portion 59b, on which the IC 61b for driving liquid crystal is mounted, overhang in directions different from each other, the external shape of the liquid crystal device 51 becomes horizontally asymmetric with respect to the effective display region V and, therefore, there has been a problem in that handling of the liquid crystal device 51 has become inconvenient.

In order to overcome this, the applicant of the present invention suggests a structure in which, as shown in FIG. 12, the substrate overhang portion 59 is installed on only a first substrate 53a, and both of the IC 61a for driving the liquid crystal on the first substrate 53a side and the IC 61b for driving the liquid crystal on the second substrate 53b side are mounted in common on the substrate overhang portion 59. In this liquid crystal device 81, since both of the ICs 61a and 61b for driving liquid crystal are mounted on one substrate overhang portion 59, the external shape of the liquid crystal device 81 becomes horizontally symmetric with respect to the effective display region V and, therefore, handling becomes very easy.

In this liquid crystal device 81, conducting materials 72 are dispersed and mixed in the inside of the sealing material 52. Subsequently, wirings 73, one end of which is connected to a terminal, that is, a bump (not shown in the drawing), of the IC 61b for driving the liquid crystal on the second substrate 53b side and the other end of which goes into the inside of the sealing material 52 and contacts the conducting material 72, are formed on the liquid crystal side surface of the first substrate 53a concurrently with the line wirings 56. On the other hand, the tips of the counter electrodes 62 formed on the second substrate 53b are extended into the inside of the sealing material 52 and contact the conducting material 72. As described above, the wirings 73 on the first substrate 53a side and the counter electrodes 62 on the second substrate 53b side are electrically conducted and connected with each other through the conducting material 72.

In the liquid crystal device 81 having the structure shown in FIG. 12, it is also desired that a light-shielding region is installed around the effective display region V and, display quality is improved. Regarding the conventional liquid crystal device 51 shown in FIG. 10, in order to install the light-shielding region around the effective display region V, the dummy pixel region W1 and the metal film region W2 are formed around the effective display region V on the surface of the first substrate 53a, on which TFD elements 54 are formed. In consideration of this, regarding the liquid crystal device 81 shown in FIG. 12 as well, it seems possible to install a light-shielding region around the effective display region V and to improve display quality if the dummy pixel region W1 and the metal film region W2 are formed around the effective display region V on the first substrate 53a.

However, regarding the liquid crystal device 81 having the structure shown in FIG. 12, since the wirings 73 are formed between the effective display region V and the sealing material 52 on the surface of the first substrate 53a, on which the TFD elements 57 and the pixel electrodes 54 are formed, the dummy pixel region W1 and the metal film region W2 cannot be formed in this region and, therefore, another problem occurs in that the light-shielding region can not be formed in this region.

The present invention was made in consideration of the aforementioned problems. Accordingly, it is an object of the present invention to provide a structure, in which a light-shielding region can be formed around an effective display region without any trouble, regarding a liquid crystal device having a structure in which a conducting material and a wiring are formed.

SUMMARY OF THE INVENTION

In order to achieve the aforementioned object, a liquid crystal panel according to the present invention includes a pair of substrates individually provided with electrodes, a sealing material with which those substrates are attached to each other, a first terminal installed on one substrate of the pair of substrates, a second terminal which is installed on the other substrate of the pair of substrates and which is connected to the electrode on the other substrate, a conducting material for electrically connecting the first terminal and the second terminal, a wiring which is installed on the one substrate and which is connected to the first terminal, and a light-shielding film installed in at least a part of a region, which corresponds to the wiring, on the other substrate.

According to this liquid crystal panel, the light-shielding film is not formed on the substrate on which the wiring is formed, but is formed on the substrate facing the wiring. Consequently, even in the liquid crystal panel having a structure in which the wiring has to be formed on the surface of the one substrate, the light-shielding region can be installed around the effective display region without any trouble.

In the liquid crystal device 81 shown in FIG. 12, the wirings 73 are installed between the effective display region V and the sealing material 52. As a matter of course, the present invention can be applied to the liquid crystal device having this structure. Also, the present invention can be applied to the liquid crystal device having the structure in which the wirings 73 are installed in a region other than the region between the effective display region V and the sealing material 52, for example, outside the sealing material 52.

In the liquid crystal panel according to the present invention, the light-shielding film can be formed from a transflective film. According to this liquid crystal panel, since the light-shielding film can be formed at the same time with formation of the transflective film, the light-shielding film can be formed easily, promptly, and precisely.

In the liquid crystal panel according to the present invention, the light-shielding film can be formed from a color filter film. According to this liquid crystal panel, since the light-shielding film can be formed at the same time with formation of the color filter film, the light-shielding film can be formed easily, promptly, and precisely.

In the liquid crystal panel according to the present invention, the light-shielding film can have a configuration in which a transflective film and a color filter film installed on the transflective film are included.

According to the liquid crystal panel having this configuration, when the liquid crystal panel is used as a light-transmissive type, transmitted light can be adequately shielded by the extended portion of the transflective film. On the other hand, when the liquid crystal panel is used as a reflective type, reflected light can be adequately shielded by the extended portion of the color filter film. According to this, regarding the transflective liquid crystal panel capable of color display, an adequate light-shielding region can be formed around the effective display region.

The liquid crystal panel according to the present invention can have a configuration in which the color filter film is composed of a first coloring layer and a second coloring layer installed on the first coloring layer, the color of the aforementioned first coloring layer is one of red, green, and blue or one of cyan, magenta, and yellow, the color of the second coloring layer is different from that of the first coloring layer, and the colors of the first coloring layer and the second coloring layer are partially different.

Such a structure of the coloring layer can be configured, for example, by the two-dimensional arrangement of laminated color of two colors selected from three colors of red, green, and blue as shown in FIG. 5. According to the liquid crystal panel having the configuration shown here, a light-shielding film of uniform cast can be attained compared with that in the case where a light-shielding film is formed simply in the monochromatic solid coating condition.

The liquid crystal panel according to the present invention can have a configuration in which the colors of the first coloring layer and the second coloring layer are different with the same pitch as the dot pitch in the effective display region. According to this, the color of the light-shielding film can be made more uniform in a plane.

The liquid crystal panel according to the present invention can have a configuration in which an electronic component is provided on the one substrate, and the wiring is connected to the electronic component. This liquid crystal panel is a liquid crystal panel of a so-called COG (Chip On Glass) system having a structure in which the electronic component is mounted directly on the substrate. It is considered that examples of electronic components used here include, IC chips, chip capacitors, chip coils, chip resistors, and other various chip components.

In the liquid crystal panel according to the present invention, the electronic component can be an IC chip. Although it is considered that examples of electronic components include, chip capacitors, chip coils, chip resistors, and other various chip components other than the IC chips, in the field of liquid crystal panels, in many cases, ICs for driving are mounted directly on the substrates. In the case of such a liquid crystal panel, many units of output bumps may be installed on the IC chip and, therefore, the number of wirings connected to them tends to increase. Consequently, when the present invention is applied to the liquid crystal panel having such a structure, an adequate light-shielding region can be formed around the effective display region regardless of increase in the number of wirings.

Another liquid crystal panel according to the present invention includes a first substrate provided with pixel electrodes, active elements connected to the pixel electrodes, and a first terminal, a second substrate provided with stripe-shaped electrodes facing the pixel electrodes and a second terminal connected to the electrodes, a sealing material with which the first substrate and the second substrate are attached to each other, a conducting material for electrically connecting the first terminal and the second terminal, wirings which are installed on the first substrate and which are connected to the first terminal, and a light-shielding film installed in the region, which corresponds to the wirings, on the second substrate.

The liquid crystal panel having this configuration corresponds to an active matrix type liquid crystal panel having a structure in which the active element is used as a switching element. It is considered that examples of active elements include, for example, TFD elements and TFT elements. In such a liquid crystal panel, even when the wirings are formed on the substrate on which the active elements are to be formed, the light-shielding region can be formed with precision around the effective display region without any hindrance of the wirings by employing the present invention.

In the liquid crystal panel according to the present invention, the light-shielding film can be formed from a transflective film. According to the liquid crystal panel having this configuration, since the light-shielding film can be formed at the same time with formation of the transflective film, the light-shielding film can be formed easily, promptly, and precisely.

In the liquid crystal panel according to the present invention, the light-shielding film can be formed from a color filter film. According to the liquid crystal panel having this configuration, since the light-shielding film can be formed at the same time with formation of the color filter film, the light-shielding film can be formed easily, promptly, and precisely.

In the liquid crystal panel according to the present invention, the light-shielding film can be formed from a transflective film and a color filter film installed on the aforementioned transflective film.

According to the liquid crystal panel having this configuration, when the liquid crystal panel is used as a transmissive type, transmitted light can be adequately shielded by the extended portion of the transflective film. On the other hand, when the liquid crystal panel is used as a reflective type, reflected light can be adequately shielded by the extended portion of the color filter film. According to this, regarding the transflective liquid crystal panel capable of color display, an adequate light-shielding region can be formed around the effective display region.

The liquid crystal panel according to the present invention can have a configuration in which the color filter film is composed of a first coloring layer and a second coloring layer installed on the first coloring layer, the color of the first coloring layer is one of red, green, and blue or one of cyan, magenta, and yellow, the color of the second coloring layer is different from that of the first coloring layer, and the colors of the first coloring layer and the second coloring layer are partially different.

Such a structure of the coloring layer can be configured, for example, by the two-dimensional arrangement of laminated color of two colors selected from three colors of red, green, and blue as shown in FIG. 5. According to the liquid crystal panel having the configuration shown here, a light-shielding film of uniform cast can be attained compared with that in the case where a light-shielding film is formed simply in the monochromatic solid coating condition.

The liquid crystal panel according to the present invention can have a configuration in which the colors of the first coloring layer and the second coloring layer are different with the same pitch as the dot pitch in the effective display region. According to this, the color of the light-shielding film can be made more uniform in a plane.

The liquid crystal panel according to the present invention can have a configuration in which an electronic component is provided on the one substrate, and the wirings are connected to the electronic component. This liquid crystal panel is a liquid crystal panel of a so-called COG (Chip On Glass) system having a structure in which the electronic component is mounted directly on the substrate. It is considered that examples of electronic components used here include, IC chips, chip capacitors, chip coils, chip resistors, and other various chip components.

In the liquid crystal panel according to the present invention, the electronic component can be composed of an IC chip. Although it is considered that examples of electronic components include, chip capacitors, chip coils, chip resistors, and other various chip components other than the IC chips, in the field of liquid crystal panels, in many cases, ICs for driving are mounted directly on the substrates. In the case of such a liquid crystal panel, many units of output bumps may be installed on the IC chip and, therefore, the number of wirings connected to them tends to increase. Consequently, when the present invention is applied to the liquid crystal panel having such a structure, an adequate light-shielding region can be formed around the effective display region regardless of increase in the number of wirings.

In the liquid crystal panel according to the present invention, the active element can be composed of a TFD.

The liquid crystal panel according to the present invention can have a configuration in which at least a part of the light-shielding film overlaps the sealing material.

When the light-shielding film terminates at the position short of the sealing material, a gap is formed between the tip of the light-shielding film and the sealing material, light leaks out through the gap and, therefore, it is feared that the contrast of an image in the effective display region is reduced and display quality is degraded. On the other hand, according to the configuration in which the light-shielding film overlaps the sealing material as in the present invention, since no gap is formed between the light-shielding film and the sealing material, degradation of display quality due to leakage of light can be avoided with reliability.

A liquid crystal device according to the present invention is provided with the liquid crystal panel having the configuration described above.

An electronic apparatus according to the present invention is provided with the aforementioned liquid crystal device. According to the electronic apparatus having this configuration, a clear image can be visually identified by installing the light-shielding region around the effective display region of the liquid crystal panel or liquid crystal device.

DETAILED DESCRIPTION OF THE PREFERRED EMBODIMENTS

First Embodiment

Figure 1:
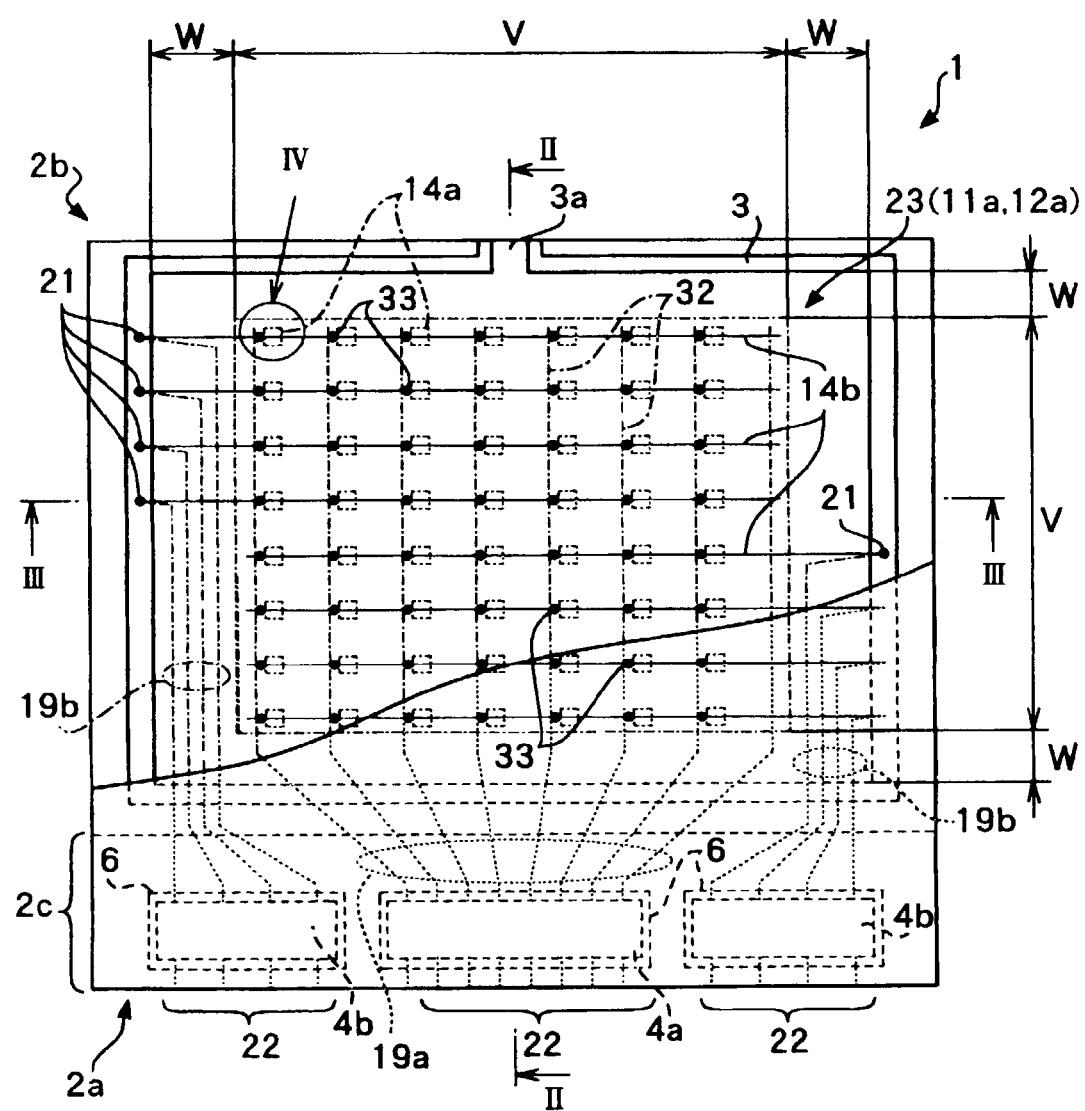
FIG. 1 is a plan view, which includes a partially cutaway view of an embodiment of a liquid crystal device according to the present invention.

The case where the present invention is applied to a liquid crystal device of an active matrix system, in which the TFD element is used as the switching element, and of a COG system, will be described below as an example. FIG. 1 shows an embodiment of the liquid crystal device. The liquid crystal device 1 shown here is formed by joining, that is, attaching, a first substrate 2a installed on the near side in the drawing and a second substrate 2b installed on the far side in the drawing to each other with a sealing material 3.

Figure 2:
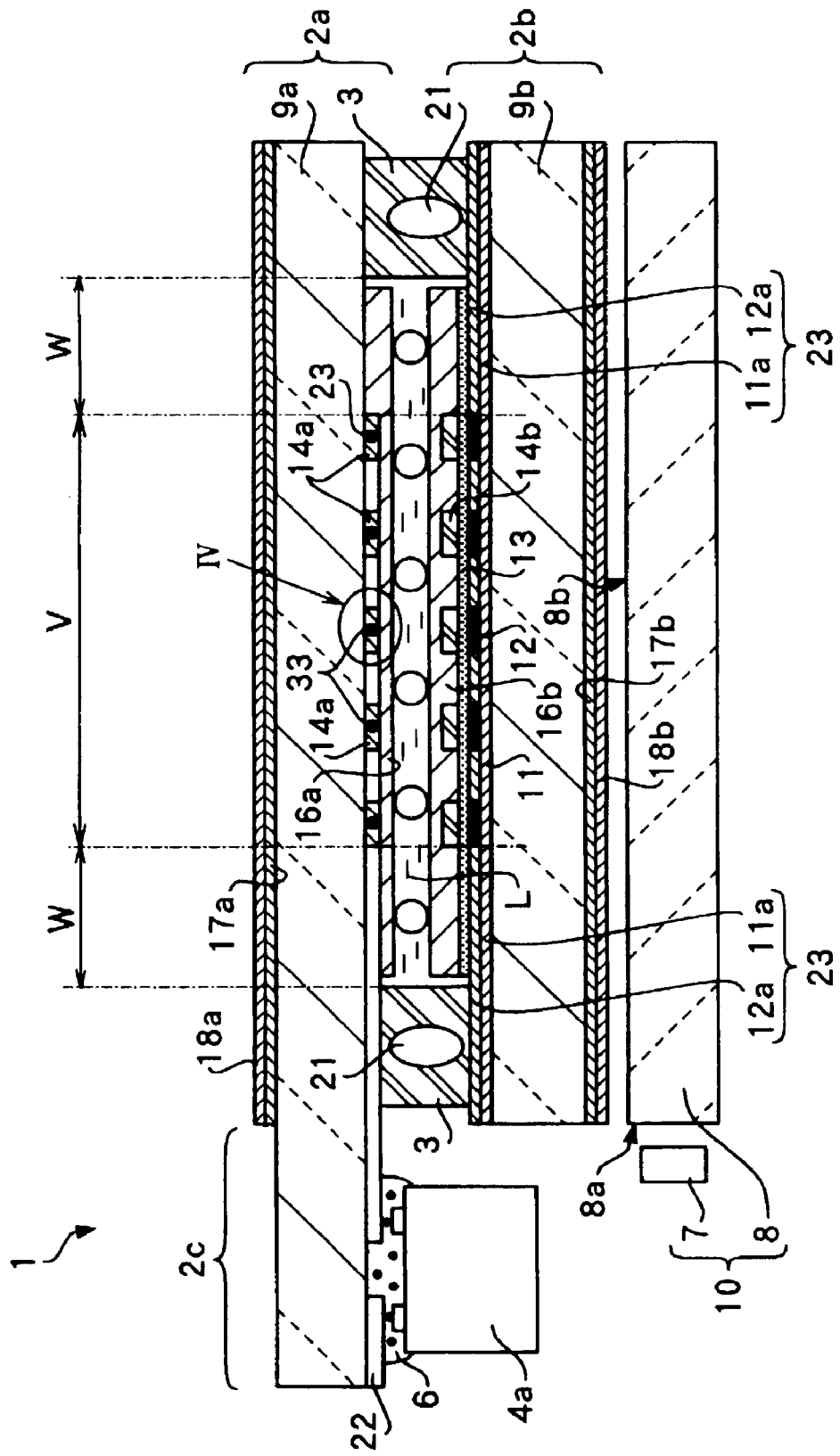
FIG. 2 is a sectional view showing a cross-sectional structure of the liquid crystal device along the line II—II in FIG. 1.

The region surrounded by the sealing material 3, first substrate 2a, and second substrate 2b constitute a gap having a constant height, that is, a so-called cell gap. Furthermore, an opening 3a for injecting liquid crystal is formed at a part of the sealing material 3. A liquid crystal is injected into the cell gap through the opening 3a for injecting liquid crystal, and after the injection is completed, the opening 3a for injecting liquid crystal is sealed with a resin, etc. FIG. 2 shows a cross-sectional structure of the liquid crystal device 1 along the line II—II shown in FIG. 1. As shown in FIG. 2, on the underside of the second substrate 2b (the lower side of the structure shown in FIG. 2), an illumination device 10 including a light emission source 7 and a light guide element 8 is installed as a backlight.

In FIG. 1, the first substrate 2a includes a substrate overhang portion 2c overhanging outside the second substrate 2b, and ICs 4a and 4b for driving liquid crystal are mounted on the substrate overhang portion 2c by a conducting adhesion element, for example, ACFs (Anisotropic Conductive Films) 6. The IC 4a for driving liquid crystal and the IC 4b for driving liquid crystal have different characteristics. The reason two types of ICs for driving liquid crystal having different characteristics are used as described above is that values of the voltages used are different between the first substrate 2a side and the second substrate 2b side, in other words, between a scanning line drive system and a signal line drive system, and, therefore, those cannot be covered with one IC chip.

In FIG. 2, the first substrate 2a includes a base material 9a, and a plurality of pixel electrodes 14a are formed on the inner surface, that is, the surface on the liquid crystal L side, of the base material 9a. As shown in FIG. 1, on the inner surface of the first substrate 2a, a plurality of linear line wirings 32 are formed in parallel with each other and in the shape of stripes, TFD elements 33 are formed in order to be conductively connected to those line wirings 32, and the plurality of pixel electrodes 14a are formed in the shape of a dot matrix with those TFD elements 33 therebetween. As shown in FIG. 2, an orientation film 16a is formed on the pixel electrodes 14a, TFD elements 33, and the line wirings 32. A phase difference plate 17a is formed on the outer surface of the base material 9a, and a polarizing plate 18a is further formed thereon.

Figure 4:
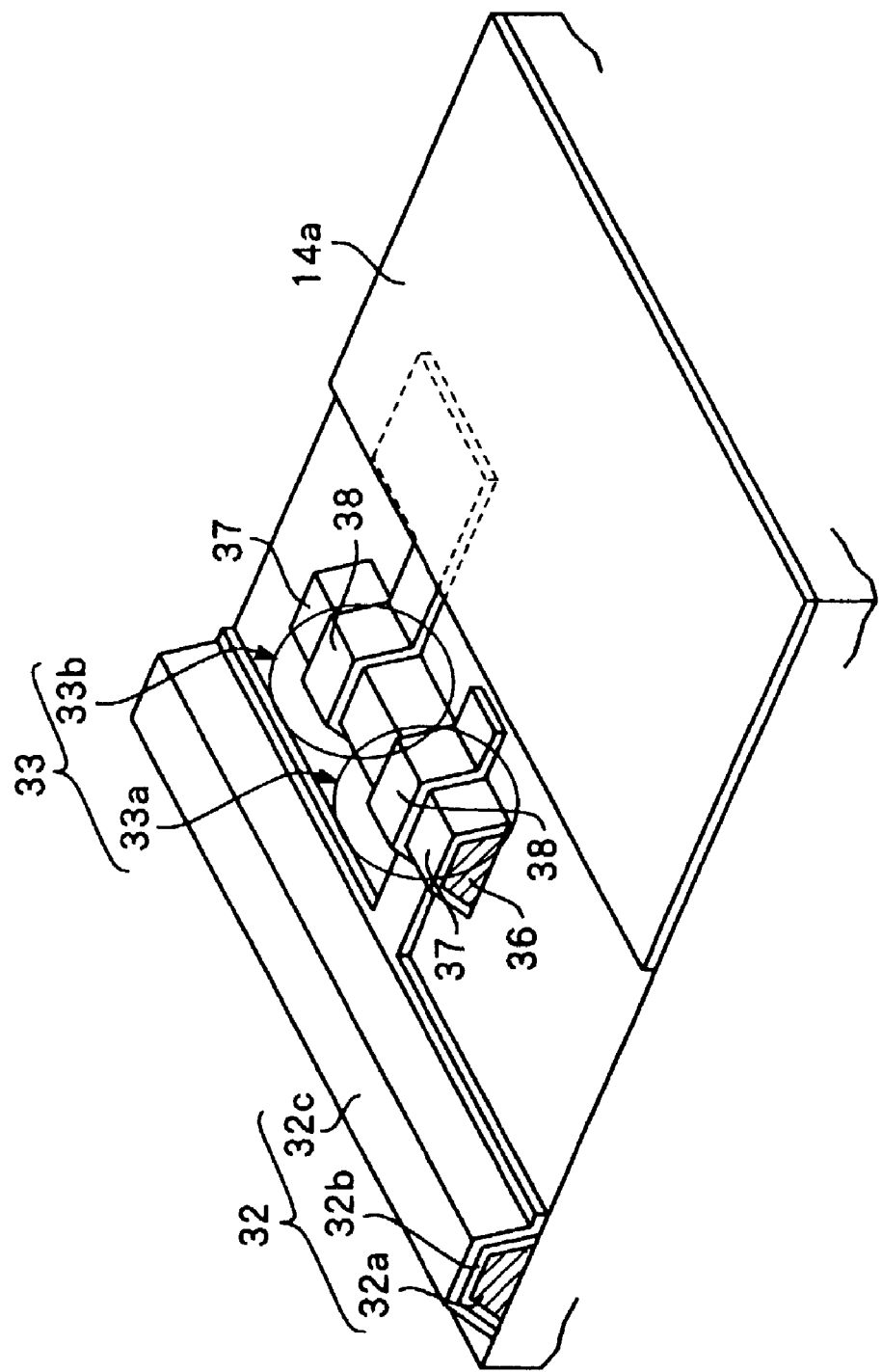
FIG. 4 is a perspective enlarged view showing a TFD element indicated by an arrow IV in FIG. 1.

The structure in the neighborhood of one TFD element indicated by an arrow IV in FIG. 1 and FIG. 2 is shown in, for example, FIG. 4. FIG. 4 shows the an embodiment using TFD elements having a so-called Back-to-Back (back-to-back) structure. In FIG. 4, the line wirings 32 are formed to have a three-layer structure composed of a first layer 32a formed from, for example, TaW (tantalum.tungsten), a second layer 32b formed from, for example, $Ta_2O_5$ (tantalum oxide), which is an anodic oxidation film, and a third layer 32c formed from, for example, Cr.

The TFD element 33 is configured by connecting a first TFD portion 33a and a second TFD portion 33b in series. The first TFD portion 33a and the second TFD portion 33b are configured to have a three-layer structure of a first metal layer 36 formed from TaW, an insulation layer 37 of $Ta_2O_5$ formed by anodic oxidation, and a second metal layer 38 of Cr which is the same layer as the third layer 32c of the line wiring 32.

The first TFD portion 33a is configured to have a laminated structure in which a current from the line wiring 32 side passes in the order of the second metal layer 38→the insulation layer 37→the first metal layer 36. On the other hand, the second TFD portion 33b is configured to have a laminated structure in which a current from the line wiring 32 side passes in the order of the first metal layer 36→the insulation layer 37→the second metal layer 38. By connecting a pair of the TFD portions 33a and 33b in series while being opposite to each other with respect to the electrical directions and, therefore, by constituting the TFD element having a back-to-back structure, stabilization of a switching characteristic of the TFD element is achieved. The pixel electrode 14a is formed from, for example, ITO, in order to be conductively connected to the second metal layer 38 of the second TFD portion 33b.

In FIG. 2, the second substrate 2b includes a base material 9b, a transflective film 11 is formed on the inner surface, that is, the surface of the liquid crystal L side, of the base material 9, a color filter film 12 is further formed thereon, an overcoat film 13 is formed thereon, second electrodes 14b are formed thereon, and an orientation film 16b is further formed thereon. A phase difference plate 17b is formed on the outer surface of the base material 9b, and a polarizing plate 18b is further formed thereon.

As shown in FIG. 1, the second electrodes 14b are formed into the shape of stripes by arranging a plurality of linear electrodes in parallel with each other in order to intersect the line wirings 32. In FIG. 1, in order to clearly show an electrode pattern, the interval between the second electrodes 14b is schematically shown being greatly enlarged. However, the interval between the second electrodes 14b is formed to be very narrow in accordance with the dot pitch of the pixel electrodes 14a.

The cross points of the pixel electrodes 14a and the second electrodes 14b are arranged in the shape of a dot matrix, each of these cross points constitutes individually one dot, and individual color patterns of the color filter film 12 shown in FIG. 2 correspond to the one dot. Regarding the color filter film 12, for example, three primary colors of R (red), G (green), and B (blue) constitute one unit and, therefore, constitute one pixel. That is, three dots constitute one unit and, therefore, constitute one pixel.

The base materials 9a and 9b are formed from, for example, glass and plastic. The transflective film 11 is formed from a light reflective material, for example, Al (aluminum). However, in order to achieve the semi-transmissive and reflective functions, sometimes, the light reflective material is formed to have a thickness thereof reduced to the extent that light can be transmitted, or sometimes, an opening for passing the light through is formed at a proper position of the transflective film 11 with a proper area ratio.

The color filter film 12 is formed by applying a coating of pigment into an appropriate pattern of mosaic arrangement, stripe arrangement, delta arrangement, etc., by the use of a known method for forming a color picture element, for example, an ink-jet method and a pigment dispersion method. The overcoat film 13 is formed by applying a uniform coating of an appropriate light-transmissive resin material by the use of, for example, a spin coating method and roll coating method.

Regarding the electrodes 14a and 14b, for example, films of ITO (Indium Tin Oxide) are applied by the use of a known film application method, such as a sputtering method and a vacuum evaporation method, and furthermore, are formed into desired patterns by a photoetching method. The orientation films 16a and 16b are formed by, for example, a method, in which a coating of polyimide solution is applied and, thereafter, baking is performed, and an offset printing method.

In FIG. 1, on the substrate overhang portion 2c of the first substrate 2a, wirings 19a extending from the line wirings 32 without modification and wirings 19b connected to the second electrodes 14b on the second substrate 2b through the conducting material 21 (refer to FIG. 2) dispersed in the sealing material are formed. Terminals 22 are formed on the side edge portion of the substrate overhang portion 2c. Each of the portions, at which the wirings 19a and the second electrodes 14b are connected by the conducting material 21, functions as a terminal.

In FIG. 2, in order to clearly show the whole liquid crystal device 1, the cross section of the conducting material 21 is schematically indicated in the shape of an ellipse. However, in practice, the conducting material 21 is formed in the shape of a sphere or a cylinder, and the size thereof is very small relative to the line width of the sealing material 3. Consequently, a plurality of conducting materials 21 can exist in the line width direction of the sealing material 3.

Since the liquid crystal device 1 according to the present embodiment is configured as described above, regarding this liquid crystal device 1, two types of display methods of the reflective display and transmissive display can be performed selectively. Regarding the reflective display, in FIG. 2, the light taken from outside of the first substrate 2a side is reflected by the transflective film 11, and is supplied to the layer of the liquid crystal L. Under this condition, the orientation of the liquid crystal is controlled on a pixel basis by controlling the voltage applied to the liquid crystal L on a pixel basis and, therefore, the light supplied into the layer of the liquid crystal L is modulated on a pixel basis, and the modulated light is supplied into the polarizing plate 18a. According to this, images, such as characters, are displayed outside the first substrate 2a.

On the other hand, when the transmissive display is performed by the liquid crystal device 1, the light emission source 7 of the illumination device 10 is made to emit. The light from the light emission source 7 is introduced in the inside of the light guide element 8 through a light incident surface 8a, and is emitted to the outside through a light exit surface 8b while being two-dimensionally spread and propagated in the inside of the light guide element 8. According to this, plane-shaped light is supplied to the layer of the liquid crystal L. This light is modulated by the liquid crystal L and, therefore, display is performed. This is the same as that in the case of the reflective display.

In either the case of the reflective display and the case of the transmissive display, images, such as characters, are formed in an effective display region V, that is, a drive region V, which is the region partitioned by picture elements, that is, pixels, formed at the portion where the pixel electrodes 14a arranged in the shape of a dot matrix and the counter electrodes 14b facing them are overlapped.

Figure 3:
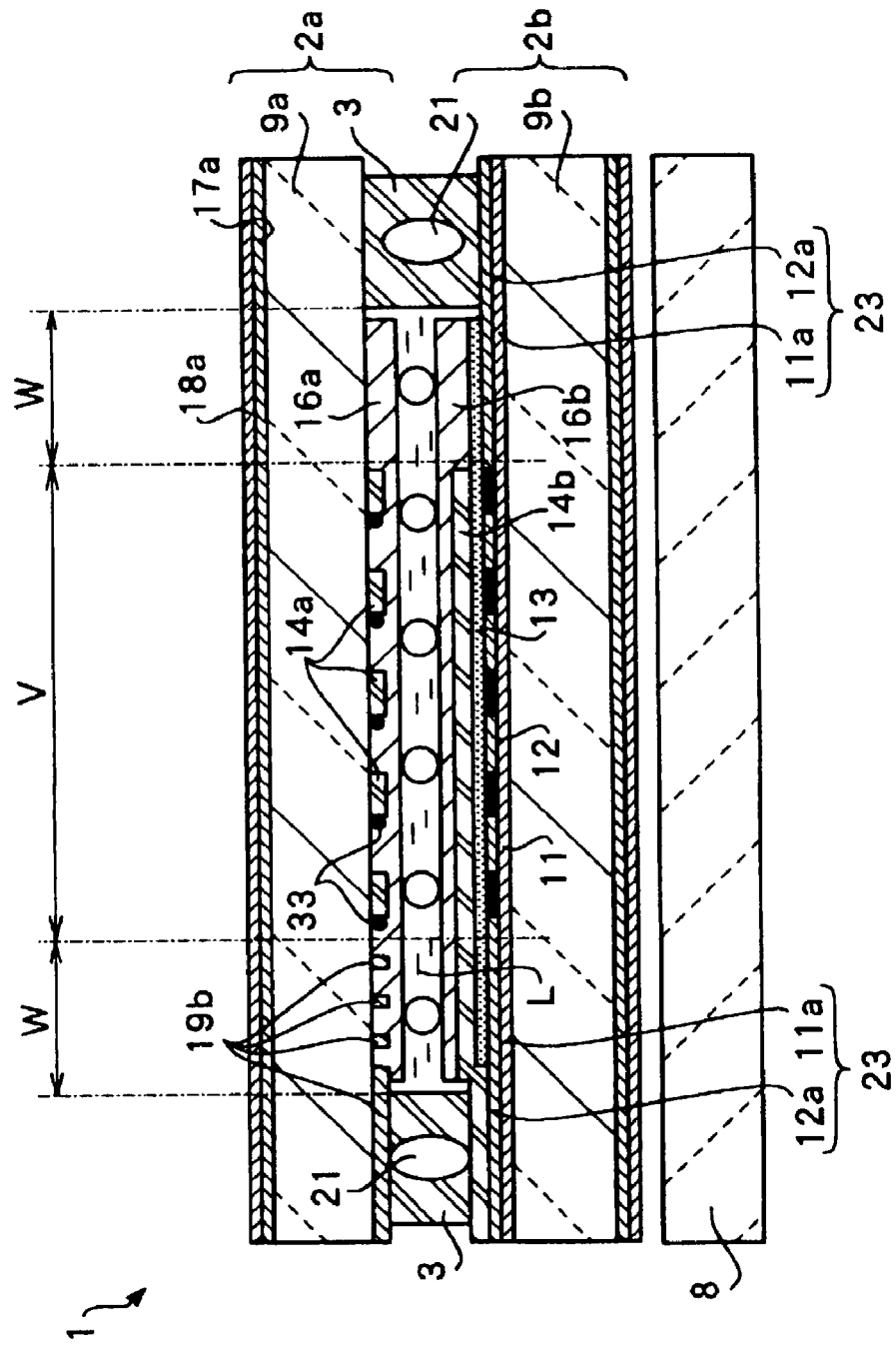
FIG. 3 is a sectional view showing a cross-sectional structure of the liquid crystal device along the line III—III in FIG. 1.

In the present embodiment, as shown in FIG. 2 and as shown in FIG. 3 which is a sectional view along the line III—III shown in FIG. 1, a light-shielding film 23 formed from a laminated structure of an extended portion 11a extended from the transflective film 11 and an extended portion 12a extended from the color filter film 12 is installed in the outside region which is on the inner surface of the second substrate 2b facing the first substrate 2a where the TFD elements 33 are formed and which continues to the effective display region V.

Regarding the present embodiment, as shown in FIG. 2 and FIG. 3, this light-shielding film 23 is extended continuously from the effective display region V, is passed under the sealing material 3, is extended outside the sealing material 3, and covers almost all over the surface of the second substrate 2b. According to this, in FIG. 1, the peripheral region W which is outside the effective display region V and which is inside the sealing material 3 is completely covered with the light-shielding film 23.

When the liquid crystal device 1 performs transmissive display, by the action of the extended portion 11a extended from the transflective film 11, the light-shielding film 23 installed in the peripheral region W of the effective display region V prevents light from the illumination device 10 from leaking from the peripheral region W of the effective display region V to the outside. When the liquid crystal device 1 performs the reflective display, by the action of the extended portion 12a extended from the color filter film 12, the light-shielding film 23 prevents the external light from being reflected in the peripheral region W of the effective display region V. Accordingly, in either the case of the transmissive display and the case of the reflective display, leakage of the light from the peripheral region W of the effective display region V to the outside can be prevented, contrast of the image formed in the effective display region V can be maintained at a high level and, therefore, display quality can be maintained at a high level.

Figure 10:
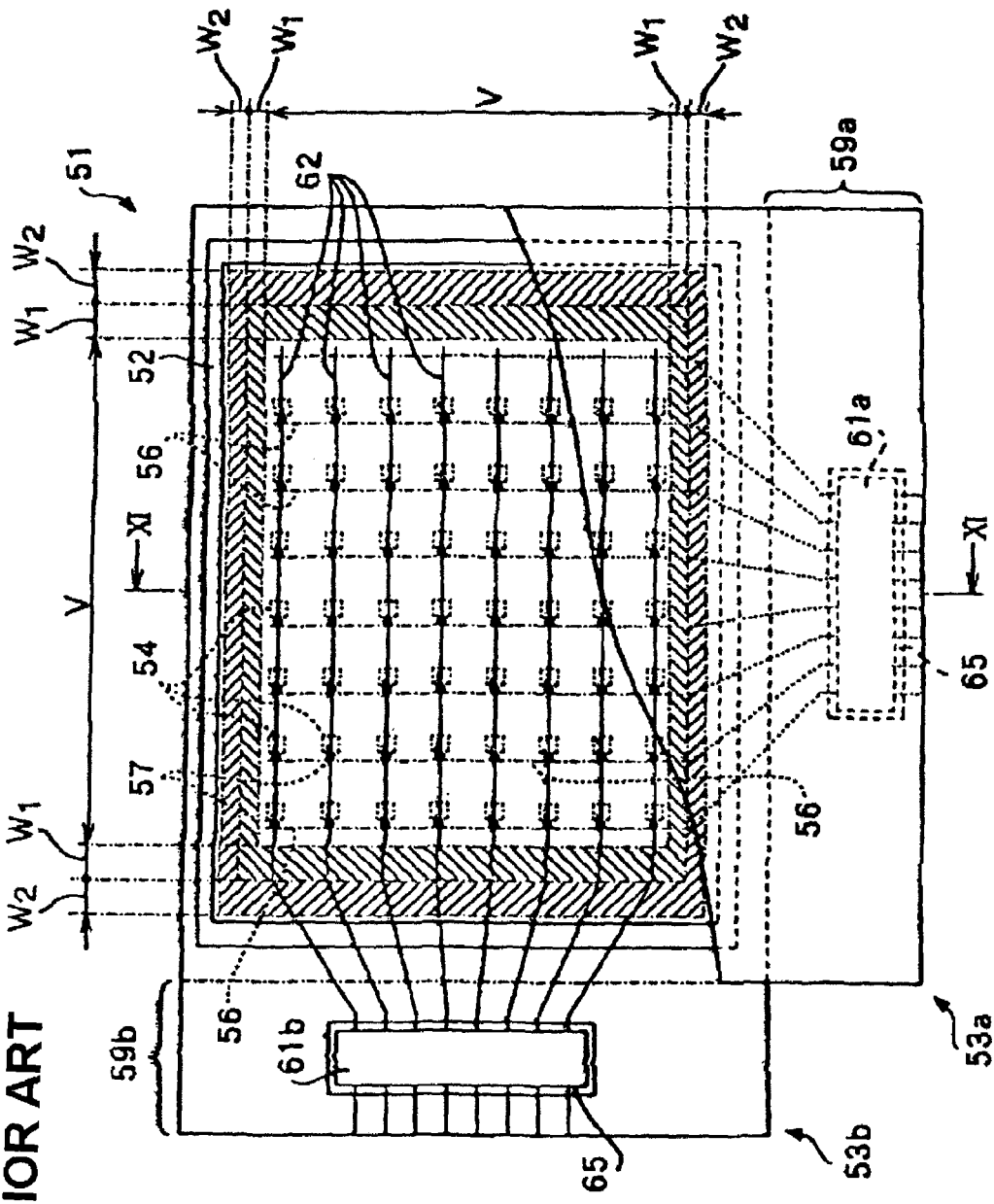
FIG. 10 is a plan view, which includes a partially cutaway view of an example of a conventional liquid crystal device.
Figure 11:
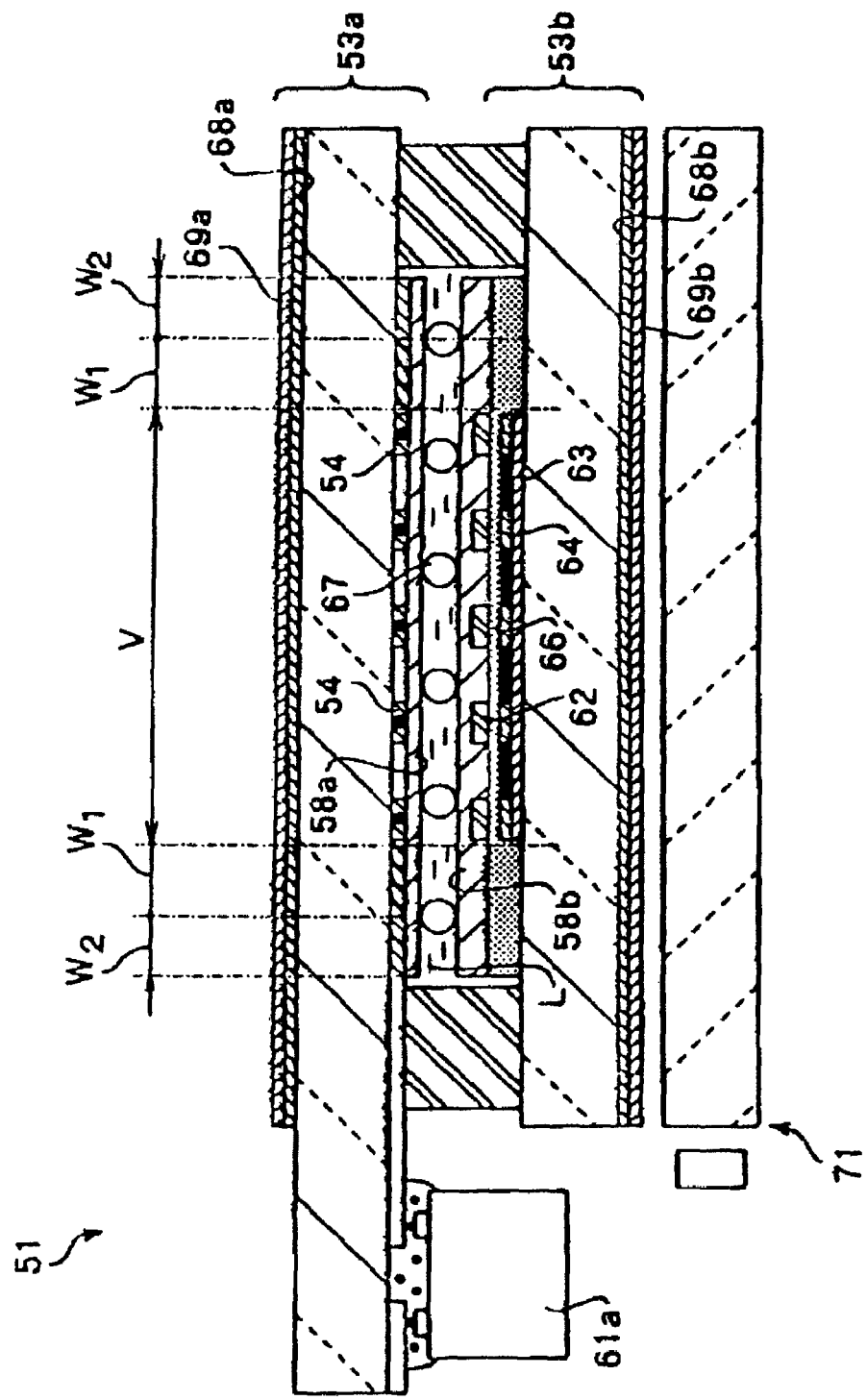
FIG. 11 is a sectional view showing a cross-sectional structure of the liquid crystal device along the line XI—XI in FIG. 10.
Figure 12:
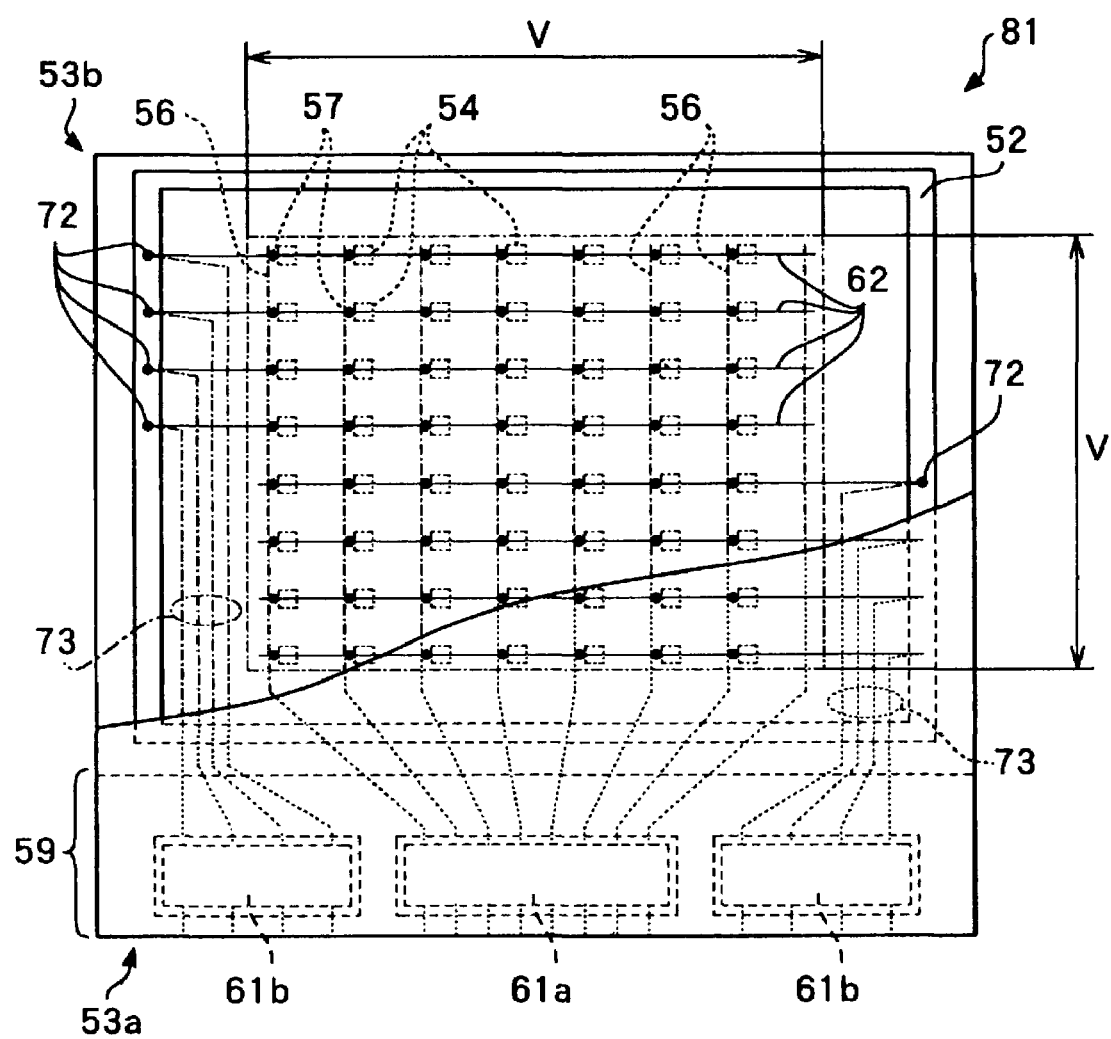
FIG. 12 is a plan view, which includes a partially cutaway view of an example of a liquid crystal device related to the liquid crystal device according to the present invention.

In the liquid crystal device 1 according to the present embodiment, as shown in FIG. 1 and FIG. 3, since wirings 19b are formed in the portion corresponding to the peripheral region W of the effective display region V on the inner surface of the first substrate 2a, the light-shielding film 23 cannot be formed by dummy pixels or metal films in the peripheral region W on the first substrate 2a on which TFD elements 33 and pixel electrodes 14a are formed in contrast to that in the case of the conventional liquid crystal device shown in FIG. 10 and FIG. 11. However, in the present embodiment, since the light-shielding film 23 is formed on the surface of the second substrate 2b corresponding to the peripheral region W as shown in FIG. 3, it has become possible to install the light-shielding film 23 without any trouble regardless of existence of the wirings 19b.

The transflective film 11 in the effective display region V is configured to achieve both semi-transmissive and semi-reflective functions by, for example, reducing film thickness and making an opening at a proper position. On the other hand, the extended portion 11a which acts as the light-shielding film 23 may be formed in order to perform both the semi-transmissive function and the semi-reflective function similarly to the transflective film 11, or may be formed not to perform semi-transmissive function.

However, since the primary function of the extended portion 11a is to shield the light from the illumination device 10 in the periphery of the effective display region V, it may be desirable that the extended portion 11a is formed not to perform the semi-transmissive function. In order that the semi-transmissive function is not performed as described above, for example, the film thickness of the transflective film 11 may be increased in the peripheral region W of the effective display region V, or such a measure that no opening for passing through the light is made in the peripheral region W of the effective display region V may be taken.

The color filter film 12 placed in the effective display region V is formed by, for example, two-dimensionally arranging the three color elements of R (red), G (green), and B (blue) or the three color elements of C (cyan), M (magenta), and Y (yellow) in a predetermined repeated pattern, such as mosaic arrangement, stripe arrangement, and delta arrangement.

Figure 5:
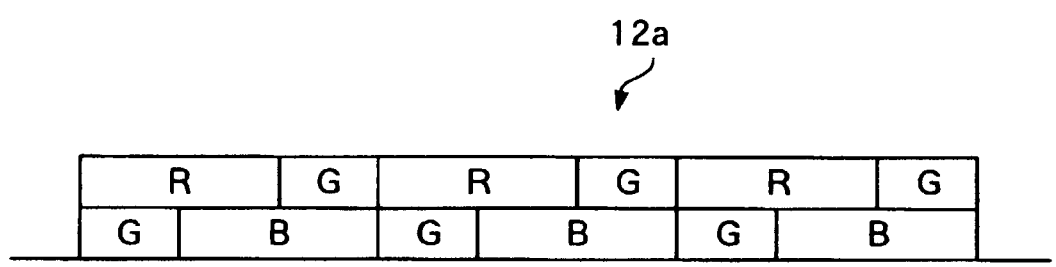
FIG. 5 is a diagram schematically showing the cross-sectional structure of an embodiment of a light-shielding film used in the liquid crystal device shown in FIG. 1.

On the other hand, the extended portion 12a which acts as the light-shielding film 23 does not necessarily have a pattern including the combination of the three color elements. For example, as shown in FIG. 5, it is possible for the extended portion 12a to have a pattern formed by choosing two colors from R, G, and B or C, M, and Y while the combination is varied, laminating them in order to form a unit color, and alternately and two-dimensionally (that is, in the vertical direction of the paper surface in FIG. 5) arranging those unit colors having different colors.

The color filter film 12 placed in the effective display region V is formed by arranging individual color picture elements in accordance with picture elements, that is, pixels. However, regarding the extended portion 12a which acts as the light-shielding film 23, the sizes of individual color picture elements are not necessarily made to be the sizes in accordance with the pixels, and the size can be made larger than that of the pixel. However, in order to efficiently prevent light reflection in the extended portion 12a, it is desirable to make the cast of the extended portion 12a uniform two-dimensionally. In order to achieve this, for example, it is desirable to arrange the unit colors constituting the extended portion 12a with the same dot pitch as the dot pitch of the pixels of the color filter film 12.

In the embodiment shown in FIG. 2 and FIG. 3, the light-shielding film 23 is formed by the laminated structure of the extended portion 11a of the transflective film 11 and the extended portion 12a of the color filter film 12. However, when it is functionally allowable, the light-shielding film 23 can be formed from the single-layer film of any one of the extended portion 11a of the transflective film 11 and the extended portion 12a of the color filter film 12.

Although the manufacturing step of the liquid crystal device 1 may become complicated, it is also possible to form the light-shielding film 23 from other materials independent of the transflective film 11 and the color filter film 12.

In the present embodiment, as is shown in FIG. 2 and FIG. 3, the extended portion 11a of the transflective film 11 and the extended portion 12a of the color filter film 12 constituting the light-shielding film 23 are formed widely while being passed under the sealing material 3 and covering almost all over the surface of the second substrate 2b.

Figure 6:
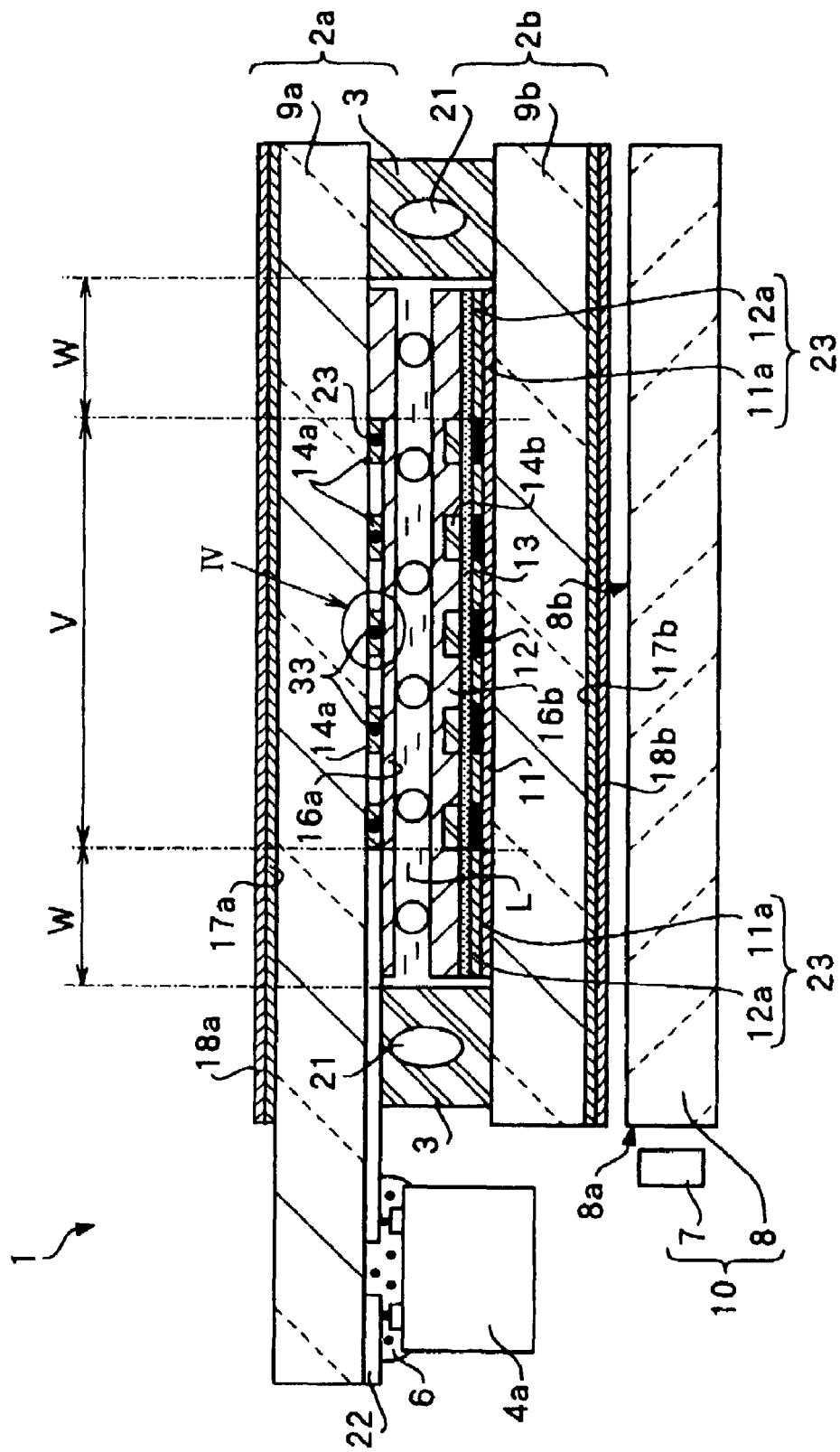
FIG. 6 is a sectional view showing another embodiment of the liquid crystal device according to the present invention.
Figure 7:
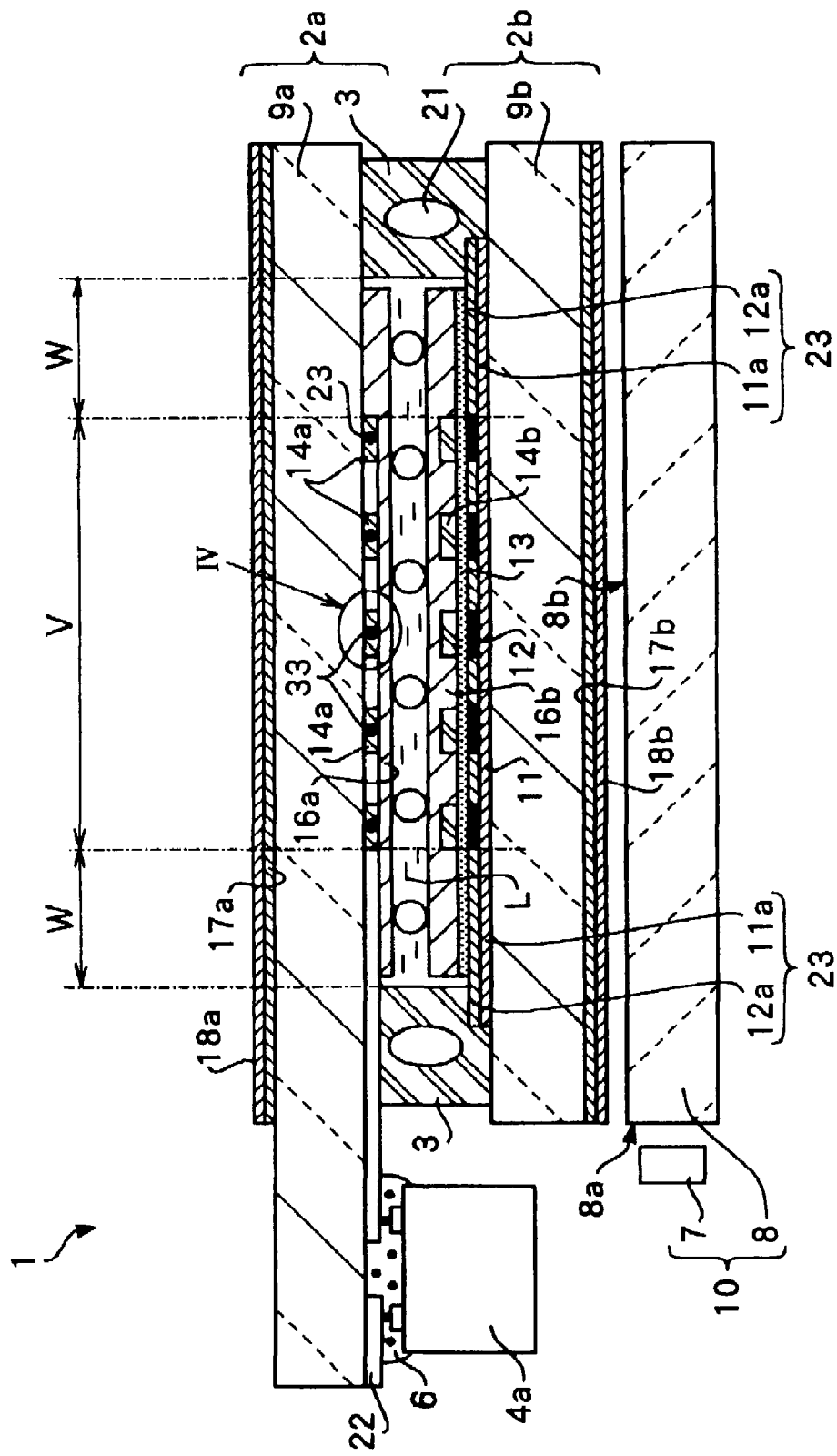
FIG. 7 is a sectional view showing another embodiment of the liquid crystal device according to the present invention.

However, the extended regions of the extended portion 11a and the extended portion 12a are not limited to this and, for example, as shown in FIG. 6, it is possible to extend the extended portion 11a and the extended portion 12a to the position in contact with or nearly in contact with the inner wall of the sealing material 3, or as shown in FIG. 7, it is possible to extend the extended portion 11a and the extended portion 12a to the position inside the sealing material 3.

Second Embodiment

Figure 8:
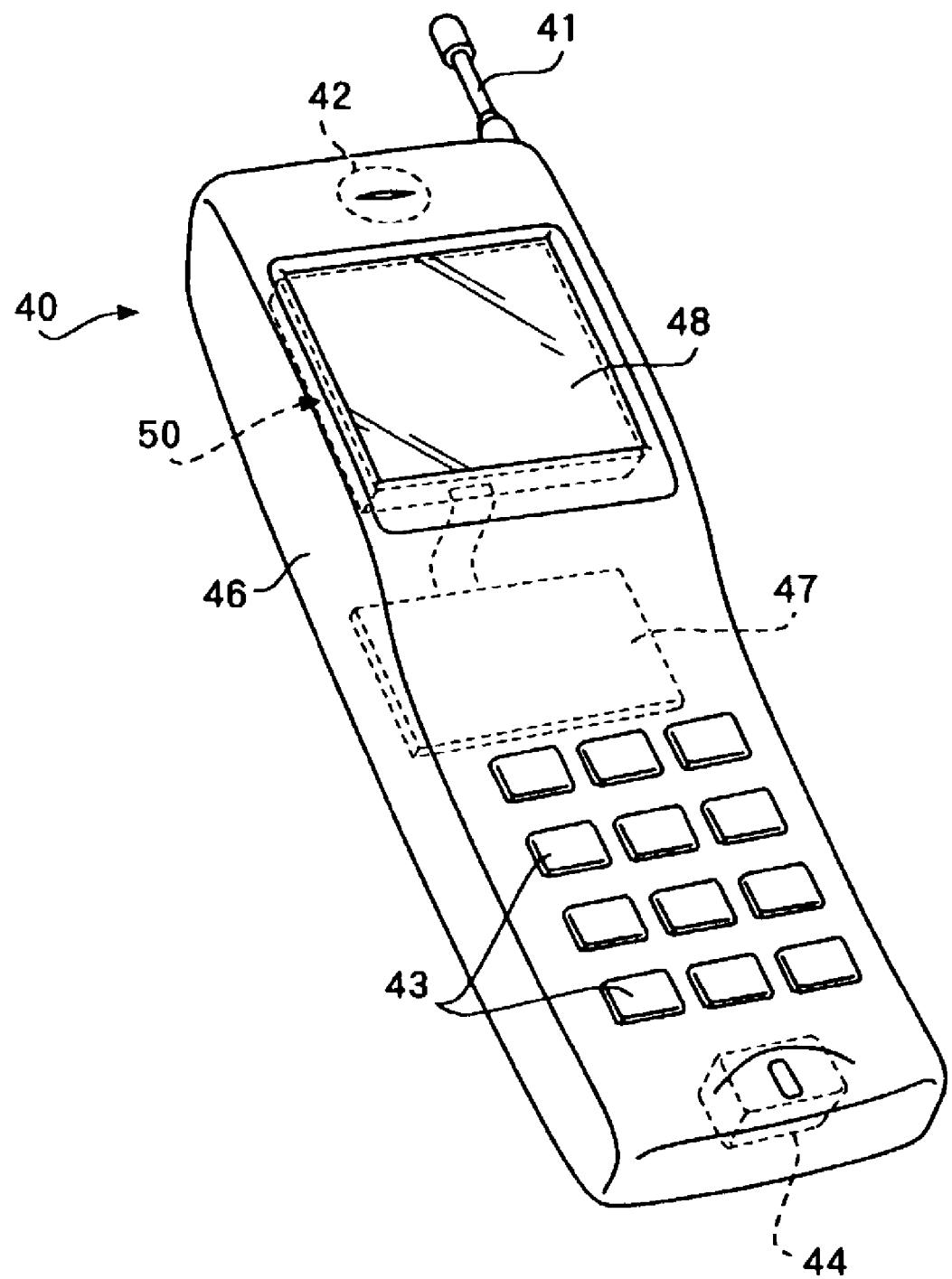
FIG. 8 is a perspective view showing an example of a cellular phone which is an embodiment of the electronic apparatus according to the present invention.

FIG. 8 shows a cellular phone which is an embodiment of the electronic apparatus according to the present invention. The cellular phone 40 shown here is configured by containing various constituents, for example, an antenna 41, a loudspeaker 42, key switches 43, and a microphone 44, in a sheath case 46. A liquid crystal device 50 used as a display device and a control circuit substrate 47 are contained in the inside of the sheath case 46.

Regarding the liquid crystal device 50, an upper surface in the drawing is the display surface. A transparent cover 48 for protecting the liquid crystal device 50 and, in addition, for ensuring the visibility of the display surface is installed on the sheath case 46 facing the display surface. The liquid crystal device 50 can be composed of, for example, the liquid crystal device 1 shown in FIG. 1.

In the cellular phone 40 shown in FIG. 8, signals input through the key switches 43 and a microphone 44 and received data by the antenna 41, etc., are input into the control circuit of the control circuit substrate 47. Subsequently, the control circuit displays images, such as numeric characters, characters, and graphics, on the display surface of the liquid crystal device 50 based on the various input data, and furthermore, transmits the transmit data from the antenna 41.

Figure 9:
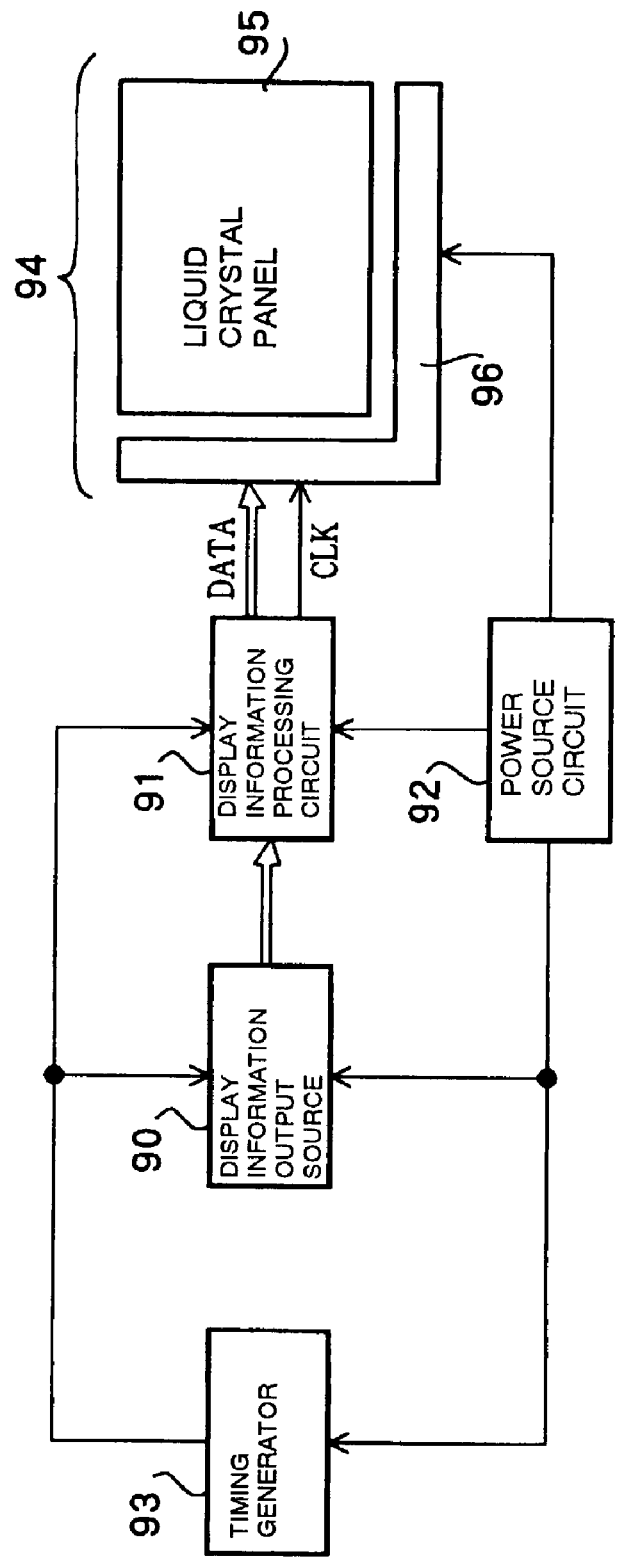
FIG. 9 is a block diagram showing another embodiment of the electronic apparatus according to the present invention.

FIG. 9 shows an embodiment of an electric control system used for the cellular phone shown in FIG. 8 or other electronic apparatuses. The electric control system shown here includes a display information output source 90, a display information processing circuit 91, a power source circuit 92, a timing generator 93, and a liquid crystal device 94 as a display device. The liquid crystal device 94 includes a liquid crystal panel 95 and a driving circuit 96. The liquid crystal device 94 can be configured by the use of the liquid crystal device 1 shown in FIG. 1.

The display information output source 90 is provided with a memory, such as a ROM (Read Only Memory) and a RAM (Random Access Memory), a storage unit, such as various disks, a tuning circuit for tuning and outputting a digital image signal, and the like, and supplies the display information, such as an image signal in a predetermined format, to the display information processing circuit 91 based on various clock signals generated by the timing generator 93.

The display information processing circuit 91 is provided with known various circuits, for example, a serial-parallel converter, an amplifying inverting circuit, a rotation circuit, a gamma correction circuit, and a clamping circuit, performs a processing of input display information, and supplies the image signal to a driving circuit 96 together with the clock signal CLK. The driving circuit 96 is configured to include a scanning line driving circuit, a data line driving circuit, an inspection circuit, etc. The power source circuit 92 supplies a predetermined voltage to each constituent.

(Other Embodiments)

As described above, the present invention has been described using the preferred embodiments. However, the present invention is not limited to the embodiments, and can be variously modified within the scope of the invention described in the claims.

For example, in the embodiments described above, the present invention has been applied to the liquid crystal device of active matrix system using the TFD element as the switching element. However, the present invention can also be applied to the liquid crystal device of active matrix system having a structure in which a three-terminal type switching element, such as a TFT (Thin Film Transistor), is used as the active element, or also be applied to the liquid crystal device of simple matrix system in which no active element is used.

The electronic apparatus according to the present invention is not limited to the cellular phone shown in FIG. 8, and it can be other arbitrary electronic apparatus, for example, a portable data terminal and a digital camera.

Advantages

As described above, by the use of the liquid crystal panel, liquid crystal device, and electronic apparatus according to the present invention, since the light-shielding film installed around the effective display region is not formed on the substrate on which the wirings are formed, but is formed on the substrate facing the wirings, even in the liquid crystal device having the structure in which the wirings have to be formed on the surface of one substrate, the light-shielding region can also be installed around the effective display region without any trouble.

The entire disclosure of Japanese patent application number 2001-243027 filed Aug. 9, 2001 is hereby incorporated by reference.

The invention claimed is:

1. A liquid crystal panel comprising:
 a pair of substrates individually provided with electrodes, the electrodes of one of the substrates crossing the electrodes of the other substrate, and the pair of substrates being separated from each other in a direction so that a gap is provided between the pair of substrates;
 liquid crystal disposed in the gap between the pair of substrates;
 a sealing material attaching said pair of substrates to each other;
 first terminals installed on the one substrate of the pair of substrates;
 second terminals installed on the other substrate of the pair of substrates and which are connected to the electrodes on the other substrate;
 a conducting material electrically connecting the first terminals and the second terminals;
 wirings installed on the one substrate and which are connected to the first terminals;
 three IC chips arranged in a row on the one substrate, the three chips including two outer IC chips and a middle IC chip, the outer IC chips being electrically connected to the wiring on the one substrate, the middle chip being electrically connected to the electrodes of the one substrate; and a light-shielding film installed on the other substrate to at least partially overlap the wirings with respect to the direction in which the pair of substrates are separated from each other.

2. The liquid crystal panel according to claim 1, wherein the light-shielding film comprises a transflective film.

3. The liquid crystal panel according to claim 1, wherein the light-shielding film comprises a color filter film.

4. The liquid crystal panel according to claim 3, wherein the color filter film comprises a first coloring layer and a second coloring layer installed on the first coloring layer, the color of the first coloring layer is one of red, green, and blue or one of cyan, magenta, and yellow, the color of the second coloring layer is different from that of the first coloring layer, and the colors of the first coloring layer and the second coloring layer are partially different.

5. The liquid crystal panel according to claim 4, wherein the colors of the first coloring layer and the second coloring layer are different with the same pitch as a dot pitch in an effective display region.

6. The liquid crystal panel according to claim 1, wherein the light-shielding film comprises a transflective film and a color filter film installed on the transflective film.

7. The liquid crystal panel according to claim 1, wherein at least a part of the light-shielding film overlaps the sealing material.

8. A liquid crystal device comprising the liquid crystal panel according to claim 1.

9. An electronic apparatus comprising the liquid crystal device according to claim 8.

10. A liquid crystal panel comprising:
a first substrate provided with pixel electrodes, active elements connected to the pixel electrodes, and first terminals;
a second substrate provided with stripe-shaped electrodes facing the pixel electrodes and second terminals connected to the electrodes, the second substrate being separated from the first substrate in a direction so that a gap is provided between the first and second substrates;
liquid crystal disposed in the gap between the first and second substrates;
a sealing material attaching the first substrate to the second substrate;
a conducting material electrically connecting the first terminals and the second terminals;
wirings installed on the first substrate and connected to the first terminals;
three IC chips arranged in a row on the first substrate, the three IC chips including two outer IC chips and a middle IC chip, the outer IC chips being electrically connected to the wirings on the first substrate, the middle IC chip being electrically connected to the pixel electrodes of the first substrate; and
a light-shielding film on the second substrate to at least partially overlap the wirings with respect to the direction in which the pair of substrates are separated from each other.

11. The liquid crystal panel according to claim 10, wherein the light-shielding film comprises a transflective film.

12. The liquid crystal panel according to claim 10, wherein the light-shielding film comprises a color filter film.

13. The liquid crystal panel according to claim 12, wherein the color filter film comprises a first coloring layer and a second coloring layer installed on the first coloring layer, the color of the first coloring layer is one of red, green, and blue or one of cyan, magenta, and yellow, the color of the second coloring layer is different from that of the first coloring layer, and the colors of the first coloring layer and the second coloring layer are partially different.

14. The liquid crystal panel according to claim 13, wherein the colors of the first coloring layer and the second coloring layer are different with the same pitch as a dot pitch in an effective display region.

15. The liquid crystal panel according to claim 10, wherein the light-shielding film comprises a transflective film and a color filter film installed on the transflective film.

16. The liquid crystal panel according to claim 10, wherein the active element further comprises a TFD.

17. A liquid crystal panel comprising:
a first substrate provided with electrodes;
a second substrate opposing the first substrate, the second substrate including electrodes that cross the electrodes of the first substrate, the first and second electrodes defining an effective display region;
liquid crystal disposed between the first substrate and the second substrate;
first wirings formed between the first substrate and the liquid crystal at a position outside the effective display region;
second wirings formed between the second substrate and the liquid crystal at a position within the effective display region;
a conductive material bringing the first wirings and the second wirings into electrical connection;
three IC chips arranged in a row on the first substrate, the three IC chips including two outer IC chips and a middle IC chip, the outer IC chips being electrically connected to the first wirings on the first substrate, and the middle IC chip being electrically connected to the electrodes provided on the first substrate; and
a light shield formed between the second substrate and the liquid crystal, the light shield including a transflective layer and a color filter layer that are located within the effective display region and that at least partially overlap the first wiring.

18. A liquid crystal panel comprising:
a first substrate provided with electrodes;
a second substrate opposing the first substrate, the second substrate including electrodes that cross the electrodes of the first substrate, the first and second electrodes defining an effective display region;
liquid crystal disposed between the first substrate and the second substrate;
first wirings formed between the first substrate and the liquid crystal at a position outside the effective display region;
second wirings formed between the second substrate and the liquid crystal at a position within the effective display region;
a conductive material bringing the first wirings and the second wirings into electrical connection;
three IC chips arranged in a row on the first substrate, the three IC chips including two outer IC chips and a middle IC chip, the outer IC chips being electrically connected to the first wirings on the first substrate, and the middle IC chip being electrically connected to the electrodes provided on the first substrate; and
a light shield formed between the second substrate and the liquid crystal, the light shield including a color filter layer that are located within the effective display region and that at least partially overlaps the first wirings, the color filter layer including a first color layer and a second color layer formed on the first color layer, the first color layer and the second color layer each including a plurality of colors selected from the group consisting of red, blue, green, cyan, magenta, and yellow, colors of the first color layer and the second color layer being juxtaposed so that there is no overlap of the same color between the first color layer and the second color layer.

19. The liquid crystal panel according to claim 18, the light shield further including a transflective layer that is located within the effective display region and that at least partially overlaps the color filter layer.

20. A liquid crystal panel comprising:
a first substrate;
a second substrate opposing the first substrate;
liquid crystal disposed between the first substrate and the second substrate;
pixel electrodes defining an effective display region;
first wirings formed between the first substrate and the liquid crystal at a position outside the effective display region;
second wirings formed between the second substrate and the liquid crystal at a position within the effective display region;
a conductive material bringing the first wiring and the second wiring into electrical connection; and
a light shield formed between the second substrate and the liquid crystal, the light shield including a color filter layer that is located outside the effective display region at least in partial overlap with the first wiring, the color filter layer including a first color layer and a second color layer formed on the first color layer, at least one of the first color layer and the second color layer including a cyan color and no overlap of the same color existing between the first color layer and the second color layer, the cyan color being selected from a group of color elements consisting of a cyan color element, a magenta color element, and a yellow color element.

* * * * *